March 27, 1934.    S. H. BOSS    1,952,580
DRY STACK CONDENSER
Filed July 21, 1930

INVENTOR
S. H. BOSS
BY J. MacDonald
ATTORNEY

Patented Mar. 27, 1934

1,952,580

UNITED STATES PATENT OFFICE 1,952,580

DRY STACK CONDENSER

Sidney H. Boss, Aldwych, London, England, assignor to Western Electric Company, Incorporated, New York, N. Y., a corporation of New York Application July 21, 1930, Serial No. 469,608
In Great Britain August 26, 1929

1 Claim. (Cl. 175—41)

This invention relates to electrical condensers of the dry stack type, i. e. wherein the dielectric situated between conducting members is of the type, such as mica, as distinct from the gaseous or liquid kind, and to a method of manufacture thereof.

Such condensers usually comprise metal conducting plates or foils such as tinfoil and interleaved sheets of dielectric material such as mica. In such condensers in order to obtain stability and a good power factor it is necessary to obtain as perfect a contact as possible between the conducting foils forming the plates of the condenser and the mica or like sheets of dielectric.

Now in the methods of manufacture of such condensers heretofore employed it has been the practice to assemble the requisite number of sheets of metal foil and interleaved sheets of dielectric between two outer clamping plates of relatively rigid material such as iron plates of substantial thickness, adapted to be urged together to exert pressure on the interposed elements, and to rely for this clamping solely on screws or nuts and bolts situated at the corners of the rigid plates. When the screws or other means are tightened excessively in an endeavor to obtain better clamping the plates bow outwardly at their centers with the result that the central region of the stack is clamped to a lesser degree than at the edges and corners or, in other words, imperfect contact over the surfaces of the foils and dielectric sheets comprising the condenser, results.

One of the objects of this invention is to effect practically perfect contact between the surfaces of the interleaved members comprising a dry stack condenser whereby stability and a good power factor may be obtained. In order to effect this result according to one feature of the invention the conducting members and the dielectric members comprising the stack are, after assembly, prior to final location in a supporting frame or the like, subjected to a distributed pressure sufficient to cause the material of the conducting members to "flow" into and remain in intimate contact with the whole of the surfaces of the dielectric members presented to the conducting members.

According to one specific example of such a manufacturing process a stack comprising a predetermined number of mica films of the desired thickness interleaved with an appropriate number of sheets of tinfoil are placed between two flat end plates of suitable rigid material such as iron. The stack thus assembled is placed between the flat surface steel dies of a suitable hydraulic press capable of exerting an extremely high pressure per unit area, such a pressure being in the neighborhood of four to five tons to the square inch. Between the rigid flat end plates of the condenser assembly and the surfaces of the dies are interposed pieces of thin sheet lead or similar easily workable metal. Pressure is now exerted and at the above mentioned pressure the tinfoil will "flow" into intimate contact with the surfaces of the associated mica sheets. The pieces of sheet lead will also "flow" under the influence of the pressure exerted and will distribute the pressure evenly over all the surfaces of the flat end plates. By means of these interposed lead sheets the uneven distribution of pressure which may be caused by surface irregularities of the end plates and dies is avoided and consequently uneven pressures which would cause local flow of the tinfoils are not transmitted thereto. The flowing of the lead sheets and the consequent distribution of the pressure applied to the stack results in an even flow of the tin foil sheets over the surfaces of the adjacent sheets of dielectric material.

Due to the even flow of the tinfoil, practically perfect contact is obtained, and only a light screw pressure is needed to hold the stack in place between suitable end plates due to the, now existing, strong force of cohesion between the tinfoil and mica. The average power factor of condensers made according to this method of manufacture is brought very near to the true power factor of the mica and such condensers exhibit great stability and small temperature coefficient.

In order to effect small adjustments in dry stack condensers to enable the capacity to be brought to a correct predetermined value it is usual and desirable to provide one or more conducting members, such as sheets of copper foil, which can be slid out over the surface of an associated sheet of dielectric in such manner that the surface area of said slidable member, presented to the contacting dielectric surface may be made smaller. Generally copper foil is used to effect this adjustment since it is more readily slidable over the dielectric surface such as that of mica even after a pressing operation such as herein described. In very small values copper foil or the like only is used as the conducting members. Such copper or like foil even after a pressing operation still makes poor contact with the mica dielectric so that the power factor is generally bad in condensers with a large proportion of copper foil to tinfoil and is still worse in stacks containing only copper foil.

In order to provide a dry stack condenser which has small value, good power factor and which may, if necessary, be adjustable within narrow limits a number of elementary condensers comprising conducting foil and interleaved dielectric in intimate contact over the whole of their surfaces are arranged in series between conducting foils forming terminals and capable of fulfilling the adjustment conditions. The series arrangement of elementary condensers is formed by alternate dielectric such as mica and unconnected conducting members such as tinfoil pressed into intimate contact in accordance with the method herein disclosed to cause the conducting foils to "flow" into intimate contact over the whole of the dielectric surfaces presented thereto.

Figure 1:
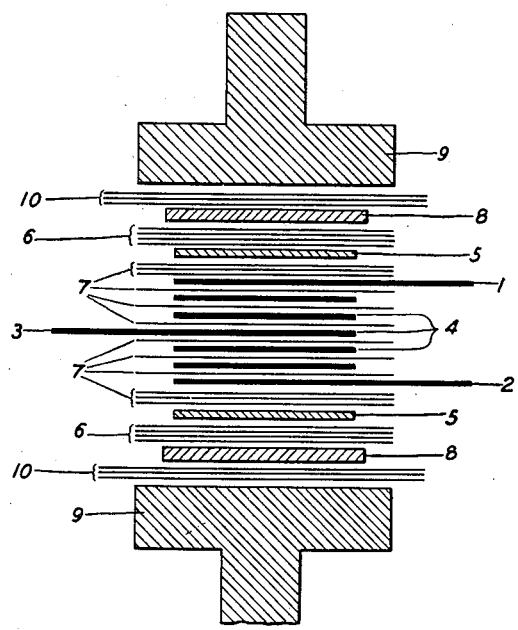
Fig. 1 is a view of the condenser stack located between the pressing dies.
Figure 2:
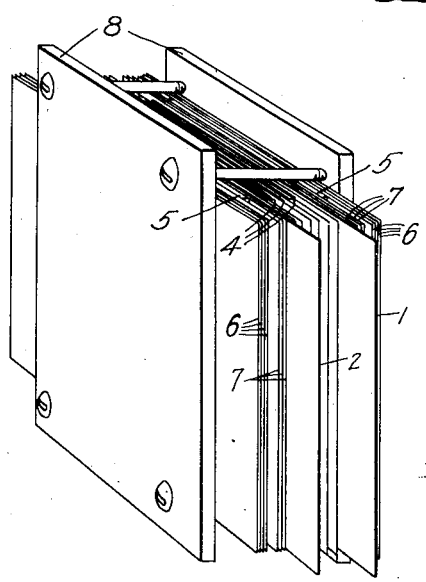
Fig. 2 is a view in perspective of the completed condenser.

As shown in Fig. 1 of the accompanying drawing 9 are the pressing dies and 10 are the lead sheets, 8 are the clamp plates, 6 are piles of several mica laminations, 5 are flat brass or steel plates of substantial thickness, 7 are mica laminations, 4 are short tinfoils, of length equal to the active length of the copper foils, 1, 2 and 3, but width (i. e. perpendicular to plane of paper), equal to the width of the copper foils and also plates 5.

The usual pressing operation is applied to the stack, by means of the dies 9. The lead sheets 10 then flow under the pressure applied and distribute the pressure evenly over the surfaces of the clamp plates 8 and compensate for any unevenness in the surfaces of the clamp plates 8 and the pressure surfaces of the pressing dies 9. The flowing of the lead sheets 10 and the even distribution thereby of the pressure applied by the pressing dies 9 also compensates for any surface irregularities in the mica sheets 7, the tinfoils, 4, also flow as before described and make intimate contact with the adjacent mica sheets 7. The capacitances between 3 and 1, and 3 and 2 of the condenser stack shown in Fig. 1; are electrically each three condensers in series the conductive condenser plates of which are in perfect contact with the adjacent interposed dielectric sheets, thus giving the same order of power factor as in condensers having greater capacitances. The tin foils, 4, do not of course affect the capacitances between the copper foils 1 and 3 or 3 and 2, i. e. the capacitance between 1 and 3 or 3 and 2 is $C/n$ where C is the capacitance per mica, and $n$ is the number of micas between foils. For instance, the capacitance between the copper foils 1 and 3 would not be changed by leaving out one of the tin foils 4, located between the copper foils 1 and 3, providing the same thickness of dielectric between the copper foils 1 and 3 was maintained. The capacitance of the condenser comprising the copper foils 1 and 3 and the interposed micas 7 and tin foils 4 depends on the size of the effective areas of the copper foils 1 and 3, the number of micas 7 therebetween and the capacitance per mica.

The plates 5 are found necessary for improving the clamping, as the inner surfaces of the clamps 8 are usually not very flat. To increase the efficiency of clamping further, unconnected tinfoils may be inserted between each mica in the piles, 6, and the bracketed pile 7 on each side of 5, and also on the surfaces of 8 and 5, which fills up the irregularities in these surfaces.

Although one specific method has been described it is to be understood that other and varied ways of carrying the invention into practice may be employed without departing from the true spirit of the invention. Thus it is to be understood that the tinfoil and mica may be substituted in the process by other materials having similar qualities whilst the character of the pressing dies, so far as shape is concerned, may be varied to suit particular requirements of the condenser to be manufactured.

What is claimed is:

The method of manufacturing dry stack condensers which comprises, placing between a pair of pressure heads a condenser stack having alternate conducting and dielectric sheets and metal end plates, placing between said pressure heads and said metal end plates sufficient soft metal sheets to compensate for surface irregularities in said dielectric sheets and said metal plates, applying sufficient pressure to said pressure heads to insure complete surface contact between the dielectric sheets and the adjacent conducting sheets in the condenser stack and removing said soft metal sheets after the metal end plates have been secured in place.

SIDNEY H. BOSS.